No. 732,119. PATENTED JUNE 30, 1903.
E. G. H. SCHENCK.
METHOD OF CUTTING PRECIOUS STONES.
APPLICATION FILED MAR. 27, 1902.
NO MODEL.

Witnesses
Inventor:
Ernest G. H. Schenck,
By his Attorney

No. 732,119. Patented June 30, 1903.

UNITED STATES PATENT OFFICE.

ERNEST G. H. SCHENCK, OF ORANGE, NEW JERSEY.

METHOD OF CUTTING PRECIOUS STONES.

SPECIFICATION forming part of Letters Patent No. 732,119, dated June 30, 1903.

Application filed March 27, 1902. Serial No. 100,164. (No specimens.)

*To all whom it may concern:*

Be it known that I, ERNEST G. H. SCHENCK, a subject of the King of Belgium, residing at Orange, New Jersey, have invented certain new and useful Improvements in Methods of Cutting Precious Stones, of which the following is a clear, full, and exact description.

One part of my invention relates to a method of cutting precious stones; and my object is to avoid the loss in weight of the stone by the methods of cutting heretofore practiced.

It has been common in the prior art to divide a stone into two parts by splitting it with a saw and then splitting off the edges and corners to form facets; but the old methods have resulted in a considerable loss in carat weight by the parts so split off, which materially diminishes the value of the main divisions of the stone; but by my method of working the stone I avoid these objections to a great extent, and by the steps which I prefer to take in dividing the stone it is split into two similar parts and at the same time partially cut with facets, by which much time and labor is saved and the carat weight lost is materially diminished.

My invention will be defined in the claims.

The drawings indicate the preferred steps in my method and also show the stone cut according to the other part of my invention.

Figure 1:
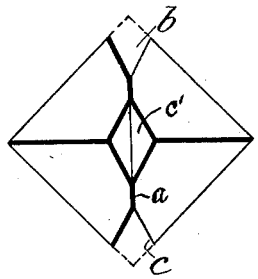
Figure 2:
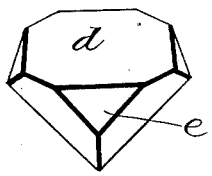
Figure 4:
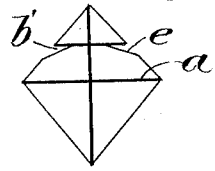
Figure 3:
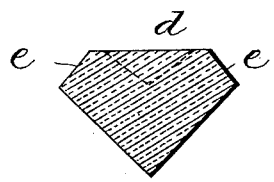

Figure 1 is a rough stone as cut by the first step. Fig. 2 shows the second step. Fig. 3 shows a vertical central section of Fig. 2, and Fig. 4 shows a modification.

The rough stone shown in Fig. 1 is a diamond having a four-sided girdle $a$, each two adjacent sides of the girdle meeting in an apex. In dividing the stone on the plane of the girdle, for example, I cut a sloping-sided notch $b$ in the stone, preferably at an apex of the girdle, as shown. This is done by presenting this corner of the stone to the notching device with the plane of the girdle in the plane of the edge of the notching device, and consequently the bottom of the notch lies in the plane of the girdle. The notch is shown as V-shaped— that is, with each of its sides sloping away from the bottom; but by "sloping sided" I do not mean that both sides of the notch must necessarily slope. I prefer to then turn the stone through an angle of one hundred and eighty degrees and make another similar notch $c$ in an opposite corner or apex, and I may also similarly notch the girdle at other points, if desired, as shown at $c'$ in Fig. 1. I then split said stone by cutting through it with a thin saw, preferably starting the cut at the bottom of the notch and continuing it through the stone parallel with the girdle to the bottom of the opposite notch, in the present instance in the plane of the girdle, and when I speak of cutting the stone in a plane parallel with the girdle I do not mean to exclude cutting it in the plane of the girdle. This divides the stone into two portions, each of which has a table $d$ and one or more facets $e$, formed by the sloping side of one of the notches, as shown in Fig. 2. This leaves each division partially provided with facets, and when a V-shaped notch is cut not only forms one or more facets $e$ on each division, but also saves the labor of cutting each of said facets separately, and, furthermore, leaves each division of a greater carat weight than would be the case if the edges of each division were ground off to form facets.

I am aware that my method as claimed may be carried out by a variety of steps without departing from the spirit of my invention, and I therefore do not limit myself to the particular steps heretofore described.

What I claim is—

1. The method of treating a precious stone which consists in cutting a sloping-sided notch in opposite sides of the girdle of said stone, the bottom of said notch lying in the plane of the girdle, and cutting through said stone from the bottom of one notch to the bottom of the other notch and parallel with the girdle, whereby the sloping sides of said notches form facets of the divisions of said stone after the stone is divided.

2. The method of treating a precious stone which consists in cutting a V-shaped notch in opposite apexes of the girdle of said stone, the bottom of said notches lying in the plane of the girdle, and cutting through said stone by a thin splitting device from the bottom of one notch to the bottom of the other notch and in the plane of the girdle, whereby the sloping sides of said notches form facets of each of the divisions after the stone is divided.

3. The method of treating a precious stone which consists in cutting a sloping-sided notch in each of two sides of said stone, the bottoms of said notches lying in a plane parallel with the girdle, and cutting through said stone from the bottom of one notch to the bottom of the other notch and parallel with the girdle, whereby the sloping sides of said notches form facets of the divisions of said stone after the stone is divided.

Signed at New York, N. Y., this 21st day of March, 1902.

ERNEST G. H. SCHENCK.

Witnesses:
EMERSON R. NEWELL,
THOMAS F. HASTINGS.